United States Patent
McKenzie

(10) Patent No.: US 9,861,917 B2
(45) Date of Patent: *Jan. 9, 2018

(54) SPIN-ON FILTER ASSEMBLY

(71) Applicant: Wix Filtration Corp, LLC, Gastonia, NC (US)

(72) Inventor: Darrell T. McKenzie, Gastonia, NC (US)

(73) Assignee: Wix Filtration Corp. LLC

( * ) Notice: Subject to any disclaimer, the term of this patent is extended or adjusted under 35 U.S.C. 154(b) by 218 days.

This patent is subject to a terminal disclaimer.

(21) Appl. No.: 14/526,121

(22) Filed: Oct. 28, 2014

(65) Prior Publication Data

US 2015/0041387 A1    Feb. 12, 2015

Related U.S. Application Data

(63) Continuation of application No. 12/814,202, filed on Jun. 11, 2010, now Pat. No. 8,869,991.

(51) Int. Cl.
*B01D 35/30* (2006.01)
*B01D 27/08* (2006.01)

(52) U.S. Cl.
CPC ............ *B01D 35/30* (2013.01); *B01D 27/08* (2013.01); *B01D 2201/34* (2013.01)

(58) Field of Classification Search
CPC ..... B01D 35/30; B01D 27/08; B01D 2201/34
USPC ........ 210/350, 440, 443, 450, DIG. 17, 442, 210/444
See application file for complete search history.

(56) References Cited

U.S. PATENT DOCUMENTS

| | | | |
|---|---|---|---|
| 4,884,506 A | 12/1989 | Guerreri | |
| 6,554,140 B2 * | 4/2003 | Steger, Jr. | B01D 27/08 210/438 |
| 6,588,602 B1 | 7/2003 | McKenzie | |
| 8,869,991 B2 * | 10/2014 | McKenzie | B01D 27/08 210/350 |
| 2006/0091064 A1 | 5/2006 | Brown et al. | |
| 2010/0005994 A1 | 1/2010 | Jacobson et al. | |

FOREIGN PATENT DOCUMENTS

| | | |
|---|---|---|
| EP | 1254692 | 11/2002 |
| GB | 1000879 | 8/1965 |
| JP | H07-328338 A | 12/1995 |
| JP | 2002-210309 A | 7/2002 |

(Continued)

OTHER PUBLICATIONS

Japanese Office Action dated Apr. 7, 2015 relating to Japanese Patent Application No. 2013-514384 (English translation provided).

(Continued)

*Primary Examiner* — Madeline Gonzalez
(74) *Attorney, Agent, or Firm* — Honigman Miller Schwartz & Cohn LLP

(57) ABSTRACT

A filter assembly that includes a filter body defining a mouth, a filter element disposed in the filter body, and a seal disposed on the mouth. The seal has a seal body defining a center axis. The seal body has an axial surface perpendicular to the center axis and an outer annular surface revolved about the center axis. A portion of the outer annular surface defines at least one of an arcuate and a substantially frustoconical shape.

20 Claims, 7 Drawing Sheets

(56) References Cited

FOREIGN PATENT DOCUMENTS

SU          1466779        3/1989
WO    WO-2009067188 A1    5/2009

OTHER PUBLICATIONS

International Search Report dated Sep. 12, 2011 relating to PCT/US2011/039964.
Non-Final Office Action dated Aug. 14, 2012 relating to U.S. Appl. No. 12/814,202.
Non-Final Office Action dated Apr. 3, 2013, relating to U.S. Appl. No. 12/814,202.
Final Office Action dated Oct. 10, 2013, relating to U.S. Appl. No. 12/814,202.
Advisory Action dated Jan. 2, 2014, relating to U.S. Appl. No. 12/814,202.
European Search Report relating to EP No. 14866954.2 dated Mar. 24, 2017.

\* cited by examiner

SPIN-ON FILTER ASSEMBLY

CROSS REFERENCE TO RELATED APPLICATION

This Application is a Continuation Application of U.S. patent application Ser. No. 12/814,202 filed on Jun. 11, 2010, now U.S. Pat. No. 8,869,991, which is entirely incorporated herein by reference.

TECHNICAL FIELD

This disclosure relates to spin-on filters.

BACKGROUND

In general, filters are used to remove contaminants, such as debris, from a flow of liquid. Filters have been used in hydraulic systems, engine lubrication systems, and engine fuel systems. Filters can be used to remove contaminants from. can remove contaminants from engine oil, transmission oil, lubricating oil, hydraulic oil, or a supply of fuel to or from a fuel pump. Other vehicle hydraulic systems, such as those in automatic transmissions and power steering, are often equipped with an oil filter. Spin on filters typically thread onto a manifold for a single use, before removal and replacement.

SUMMARY

The disclosure provides a filter assembly having a seal that provides at least two sealing surfaces or seal interfaces for engagement with a received filter head (e.g., engine block mounting base). A first sealing surface is arranged for axial contact with the filter head and a second sealing surface is arranged for radial contact with the filter head. The first sealing surface may be flat or arcuate, while the second sealing surface can be arcuate and/or angled greater than 90 degrees with respect to the first sealing surface. The second sealing surface can provide self-location of the filter assembly in the filter head as well an inner circumferential seal. The seal can be made of a compliant and/or elastic material, such as rubber, to provide a seal or to deform to accommodate slightly different sizes of filter heads.

One aspect of the disclosure provides a filter assembly that includes a filter body defining a mouth, a filter element disposed in the filter body, and a seal disposed on the mouth. The seal has a seal body defining a center axis. The seal body has an axial surface perpendicular to the center axis and an outer annular surface revolved about the center axis. A portion of the outer annular surface defines at least one of an arcuate and a substantially frustoconical shape.

In some implementations, a radius of the outer annular surface about the center axis increases from a plane of the axial surface along the center axis to a threshold radius. Moreover, the radius of the outer annular surface about the center axis may decrease along the center axis after reaching the threshold radius. In some examples, the filter body defines a substantially cylindrical shape and has first and second opposite end portions, the first end portion defining the mouth.

Another aspect of the disclosure provides a filter assembly that includes a filter body defining a mouth, a filter element disposed in the filter body, and a seal disposed on the mouth. The seal has a seal body defining a center axis. The seal body has an axial surface perpendicular to the center axis and an outer annular surface forming a shoulder with the axial surface. A portion of the outer annular surface extends away from the axial surface at an angle greater than 90 degrees. In some implementations, a portion of the outer annular surface defines at least one of an arcuate and a substantially frustoconical shape.

In yet another aspect of the disclosure, a filter assembly includes a filter body defining a mouth, a filter element disposed in the filter body, and a seal disposed on the mouth. The seal has a seal body defining a center axis. The seal body has first and second axial surfaces disposed opposite of each other and perpendicular to the center axis. The seal body also has an outer annular surface concentric with the center axis and defines an arcuate surface. The second axial surface attaches to the mouth.

In some implementations, a radius of the outer annular surface about the center axis increases from a plane of the axial surface along the center axis to a threshold radius. The radius of the outer annular surface about the center axis may decrease along the center axis after reaching the threshold radius.

Implementations of the disclosure may include one or more of the following features. In some implementations, the filter body defines a substantially cylindrical shape and has first and second opposite end portions, the first end portion defining the mouth. The filter assembly may include a cover disposed over the mouth. The seal body defines a groove received by at least one of a mouth rim of the filter body and the cover. In some examples, a biasing element disposed in the filter body biases the filter element toward the mouth. Moreover, a filter support can be disposed in the filter body and arranged to support at least a portion of the filter element on a side opposite of the biasing element. The biasing element biases the filter element against the filter support.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
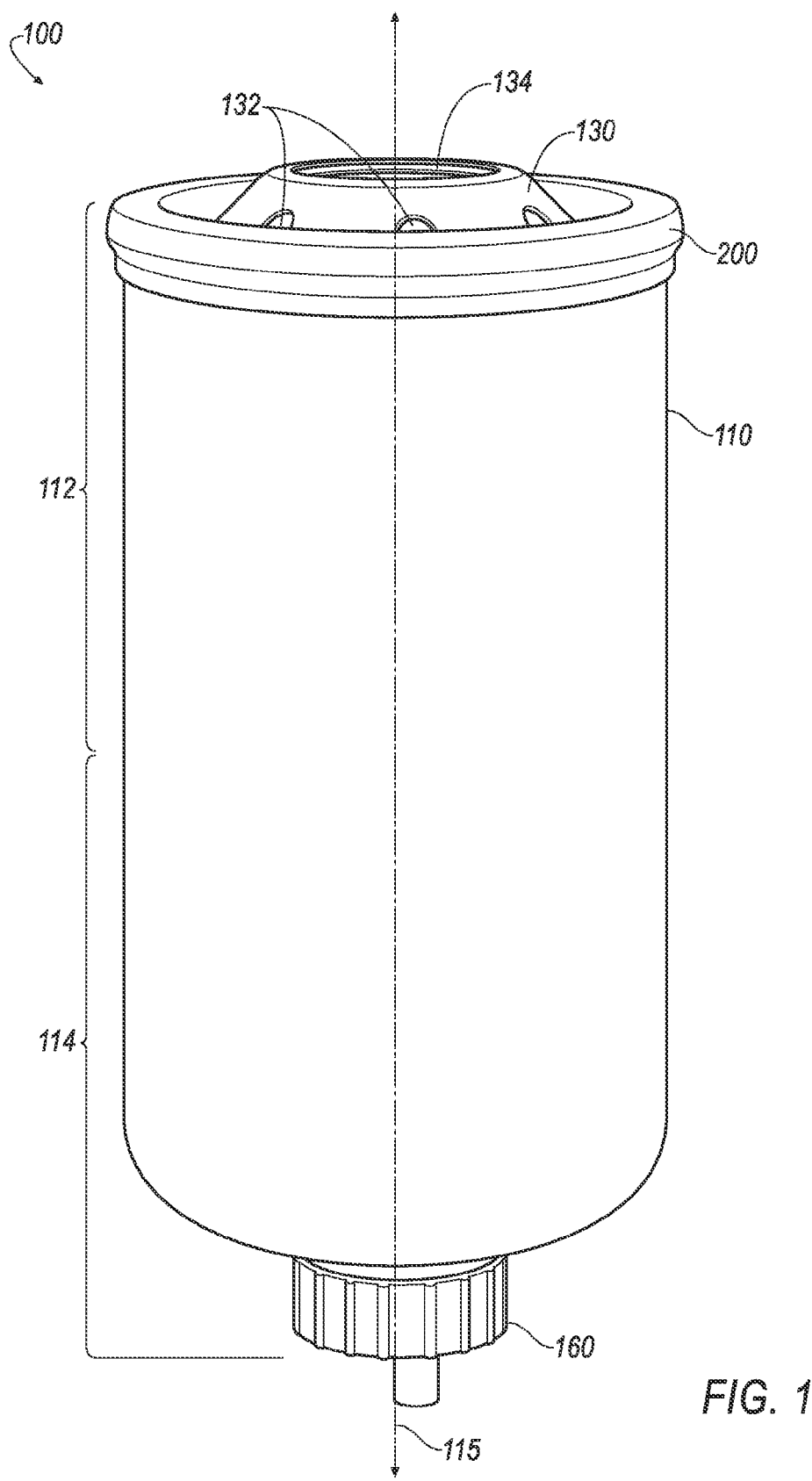
FIG. 1 is a perspective view of an exemplary filter assembly.
Figure 2:
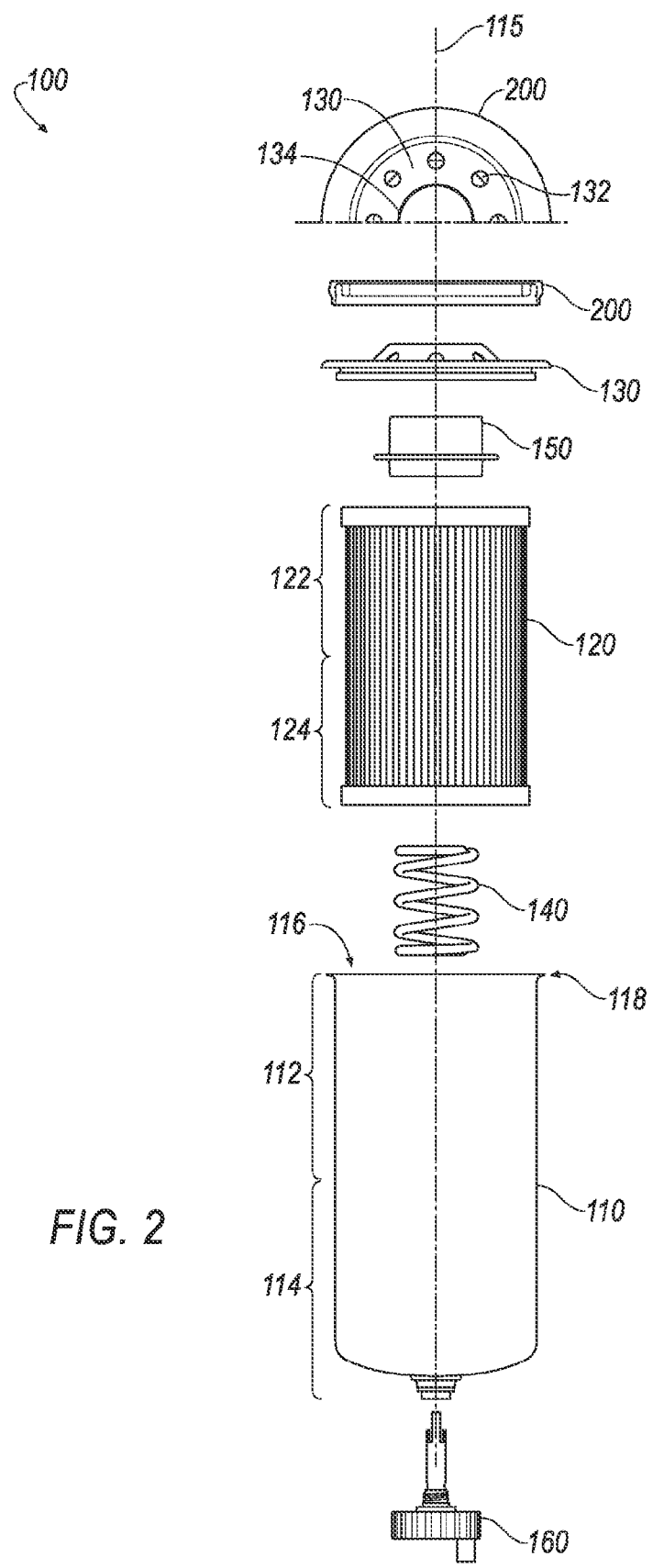
FIG. 2 is an exploded side view of an exemplary filter assembly.

Referring to FIGS. 1 and 2, in some implementations, a filter assembly 100 includes a filter body 110 (also known as a can) that houses a filter element 120. The filter body 110 defines a center axis 115 and has a first end portion 112 that defines a mouth 116 for receiving the filter element 120 and a second end portion 114, opposite of the first end portion 112. The filter body 110 may define a substantially cylindrical shape and can be formed of metal, aluminum, and/or plastic. A cover 130 can be removably disposed or permanently attached over the mouth 116 to enclose the filter 120 in the filter body 110.

Figure 4:
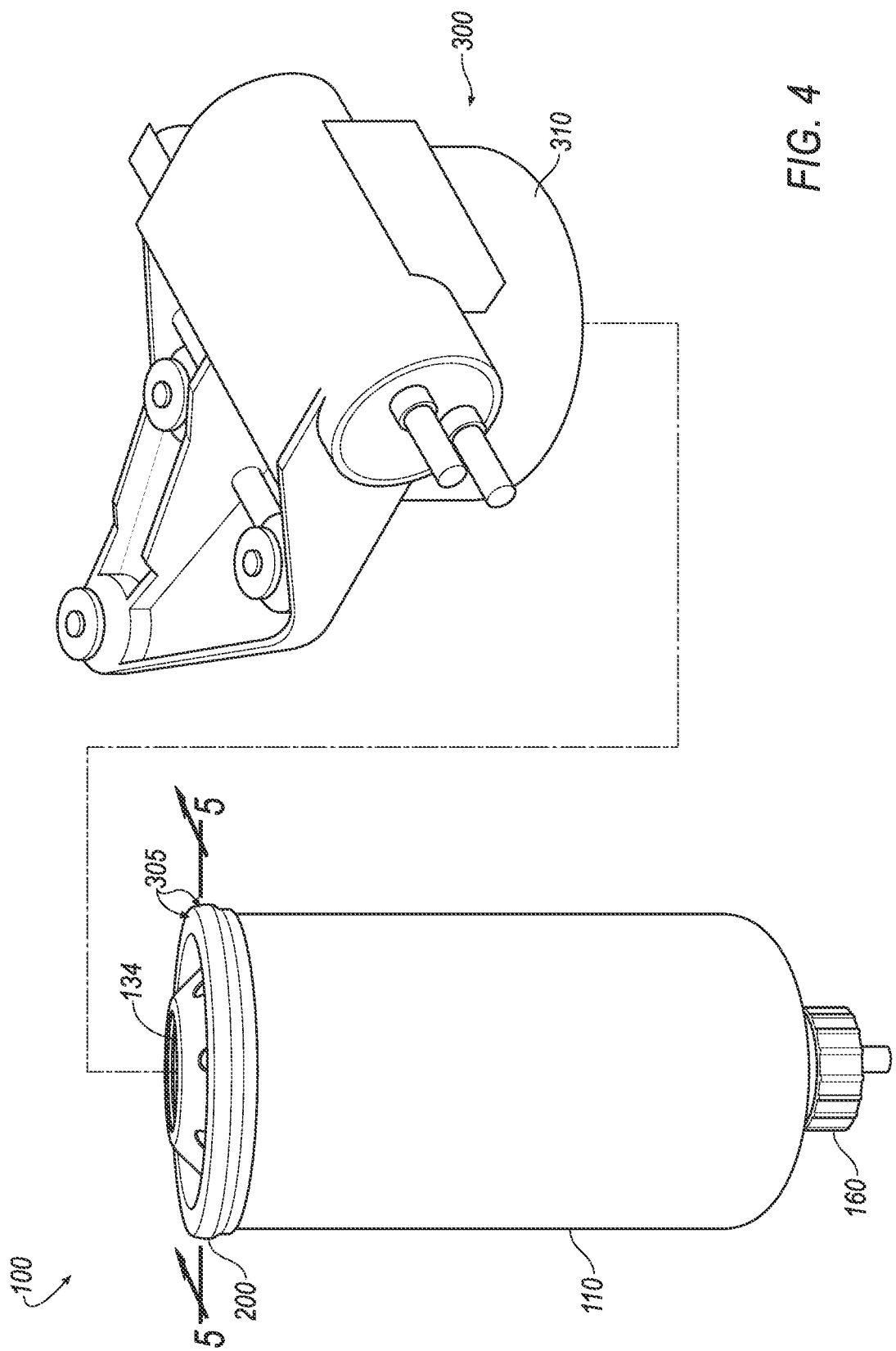
FIG. 4 is a perspective view of an exemplary filter assembly connecting to an exemplary filter head.

A biasing element 140, such as a retaining spring, holds the filter element 120 against a filter support 150 in the filter body 110. The filter support 150 is arranged to support at least a first end portion 122 of the filter element 120 on a side opposite of the biasing element 140. The biasing element 140 biases the filter element 120 against the filter support 150, which may be disposed inside the filter body 110 and against the cover 130. The biasing element 140 may be arranged in the filter body 110 to support or engage a second end portion 124 of the filter element 120, opposite of the first end portion 122. The biasing element 140 can maintain the filter element 120 in sealing engagement with the cover 130. In some examples, the filter assembly 100 includes a valve assembly 160 disposed on the first end portion 112 of the filter body 110 and in fluid communication with an interior portion of the filter body 110. The filter assembly 100 may include a seal 200 disposed on the first end portion 112 of the filter body 110. The seal 200 seals an interface 305 between a filter head 300 (e.g., an engine block mounting base) and the filter assembly 100, as shown in FIG. 4, for example.

Figure 3:
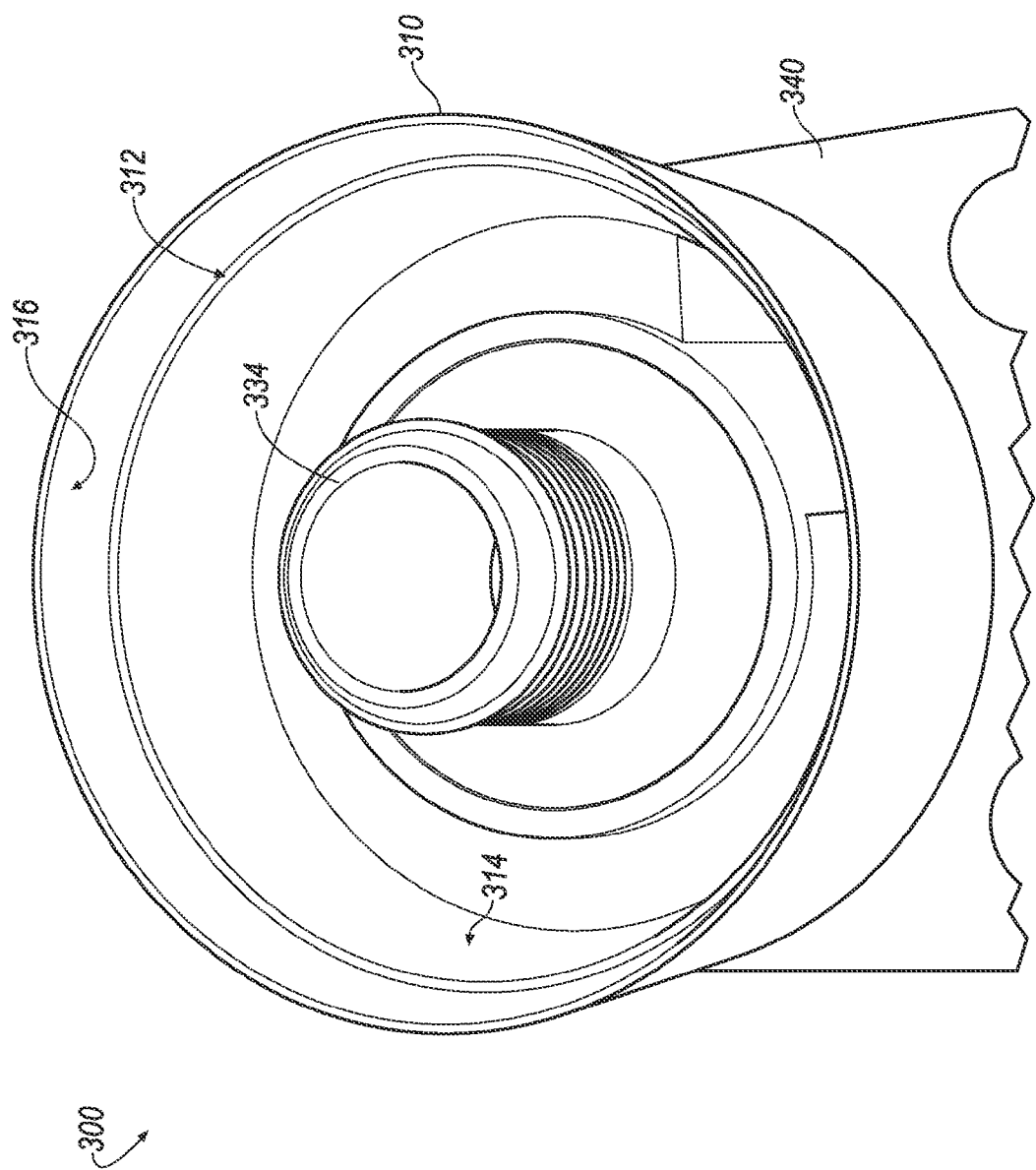
FIG. 3 is a perspective view of an exemplary filter head.

Referring to FIG. 3, in the example shown, the filter head 300 includes a mounting receptacle 310 having an inner bottom surface 312 and inner side walls 314. A threaded nipple 334 disposed on the inner bottom surface 312 provides fluid communication with a manifold 340.

Referring to FIGS. 1 and 3-5, in some implementations, the cover 130 defines apertures 132 for receiving a flow of fluid into the filter body 110. Moreover, the cover 130 may define a threaded aperture 134 for securing or mounting the filter assembly 100 to the filter head 300. The threaded aperture 134 can be received by a corresponding threaded nipple 334 of the filter head 300. The cover 130 may be stamped, molded, or machined and assembled to the filter body 110. In the example shown in FIG. 5, the cover 130 is retained in the filter body 110 by a cover retainer 136 (e.g., an annular plate) attached to a rim 118 of the mouth 116.

Figure 5:
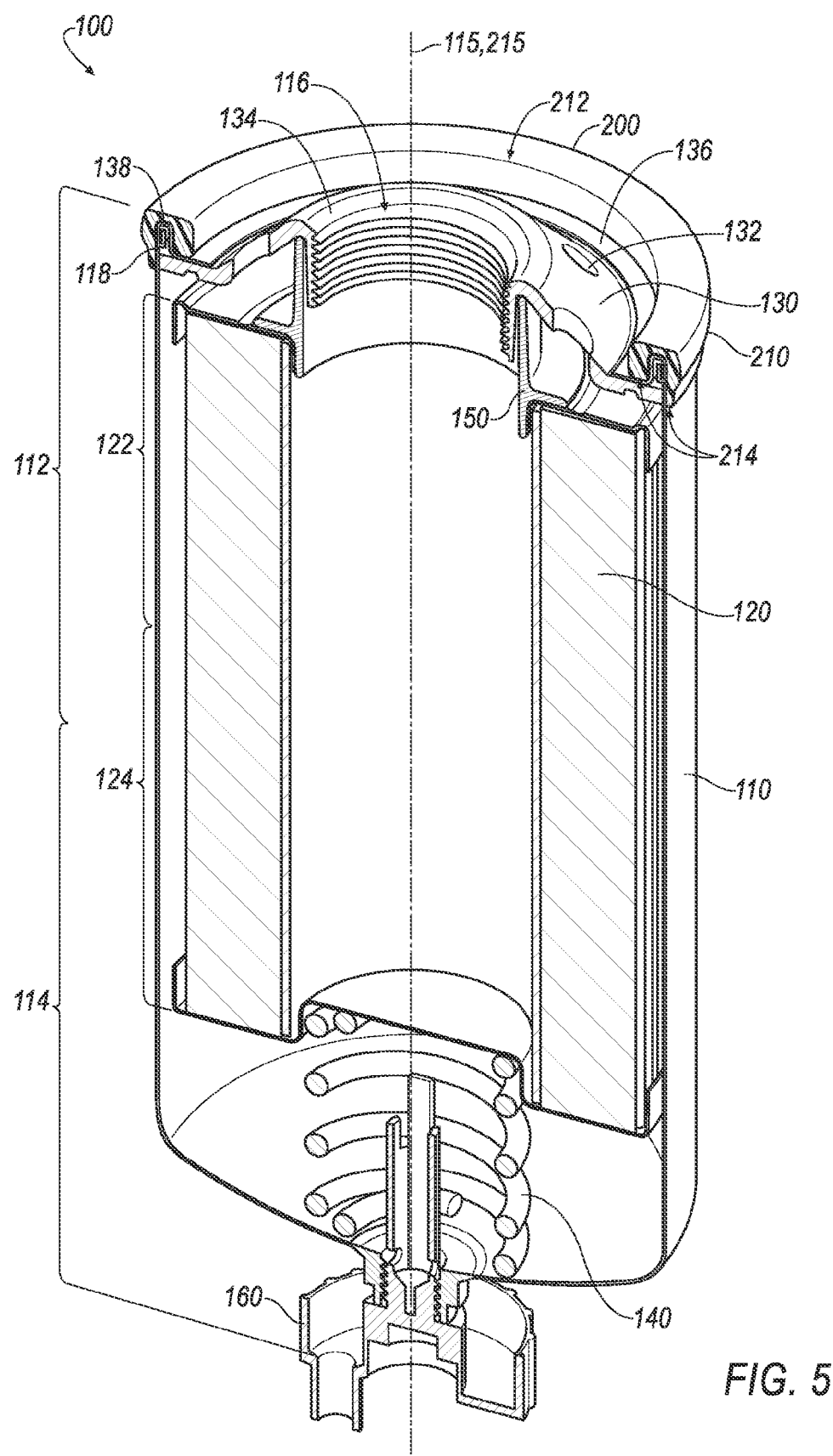
FIG. 5 is a cross-sectional view of the filter assembly shown in FIG. 4 along line 5-5.
Figure 6:
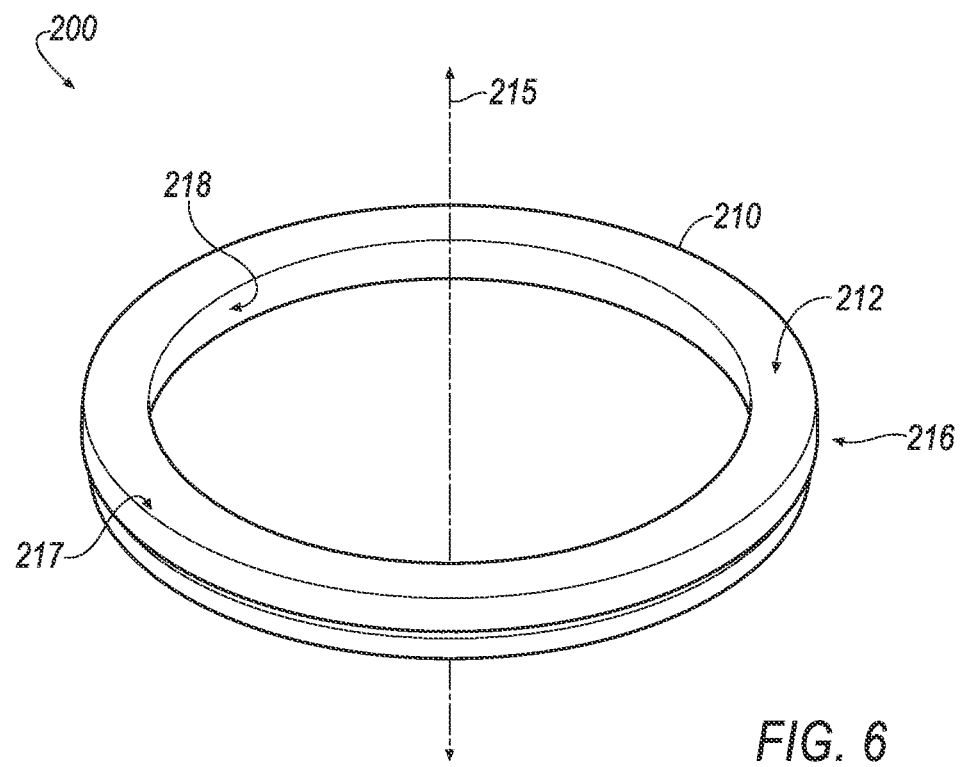
FIG. 6 is a top perspective view of an exemplary seal for a filter assembly.
Figure 7:
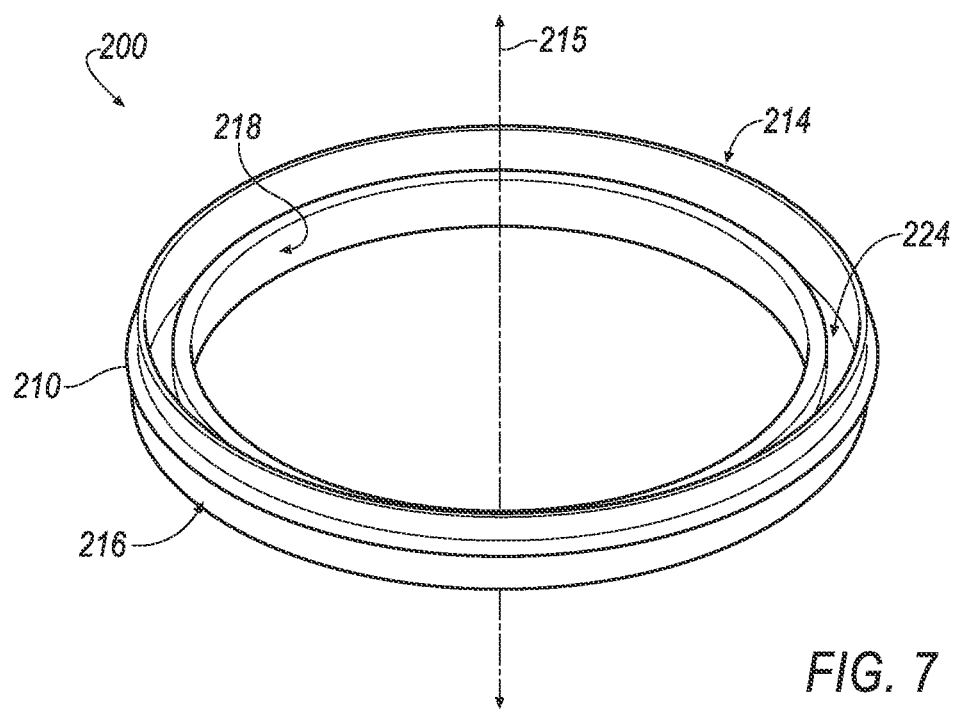
FIG. 7 is a bottom perspective view of the seal shown in FIG. 6.

Referring to FIGS. 5-7, in some implementations, the seal 200 is disposed on a rim 118 of the mouth 116 and/or a rim 138 of the cover 130 or cover retainer 136 attached to the mouth 116. The seal 200 has an annular seal body 210 (e.g., a ring) defining a center axis 215. In some examples, the center axis 215 of the seal body 210 is arranged co-linear with the center axis 115 of the filter body 110. The seal body 210 has a first axial surface 212, a second, opposite axial surface 214, an outer annular surface 216, and an inner annular surface 218. The first and second axial surfaces 212, 214 may be substantially planar and/or lie in a plane that is perpendicular to the center axis 215. The outer and inner annular surfaces 216, 218 may be concentric with the center axis 215.

The first axial surface 212 can be a first sealing surface or interface for maintaining fluid communication between the filter assembly 100 and the filter head 300. Referring again to FIGS. 3 and 4, the first axial surface 212 engages a corresponding axial surface 312 of the filter head 300 when the filter assembly 100 is received by the filter head 300 (e.g., by threading the threaded cover aperture 134 onto the corresponding threaded nipple 334 of the filter head 300). In the examples shown, the first axial surface 212 defines a substantially flat surface; however, other surface profiles are possible as well. For example, the first axial surface 212 may define an arcuate surface, a ribbed surface or an undulating surface.

Referring to FIGS. 5 and 7, the second axial surface 214 defines an annular groove or channel 224 configured to receive at least a portion of the first end portion 112 of the filter body 110, such as a rim 118 of the mouth 116, and/or a rim 138 of the cover 130 attached to the mouth 116. The groove or channel 224 can be sized for an interference fit or sealing connection onto the filter body 110 and/or the cover 130 for retaining or attaching the seal 200 onto the filter assembly 100. In some examples, the seal 200 is fastened or affixed to the filter body 110 and/or the cover 130 (e.g., with an adhesive or fastener, such as a pin, screw, rivet, etc.).

Figure 8:
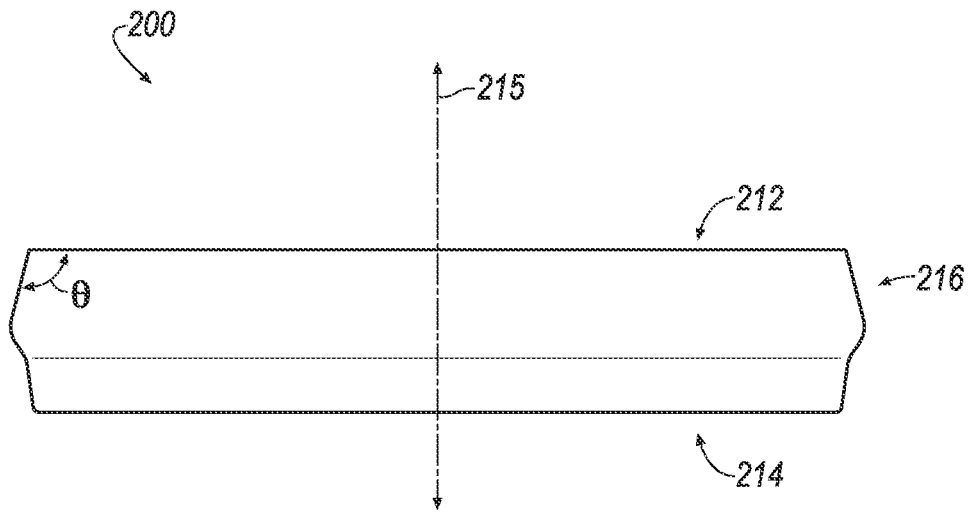
FIGS. 8 and 9 are side views of exemplary seals for a filter assembly.

Referring to again to FIGS. 3, 4 and 6, the outer annular surface 216 may provide a second sealing surface or interface with the received filter head 300 (e.g., for maintaining fluid communication between the filter assembly 100 and the filter head 300). The outer annular surface 216 is configured to engage a corresponding inner annular surface 316 of the filter head 300. As the inner annular surface 316 of the filter head 300 may define a frustoconical shape, in some implementations, the outer annular surface 216 may define a frustoconical shape as well. In the example shown, the outer annular surface 216 defines an arcuate surface; however other profiles that provide a variable surface height are possible as well. For example, the outer annular surface 216 can define a chamfered surface (e.g., FIG. 8).

In some implementations, the first axial surface 212 is arranged perpendicular to the center axis 215 and an outer annular surface 216 forms a shoulder 217 with the first axial surface 215. In the example shown in FIG. 8, the outer annular surface 216 extends away from the first axial surface 212 at an angle θ greater than 90 degrees. For example, a portion of the outer annular surface 216 can define a substantially frustoconical shape. In addition, a portion of the outer annular surface 216 can define a curved shape.

Figure 9:
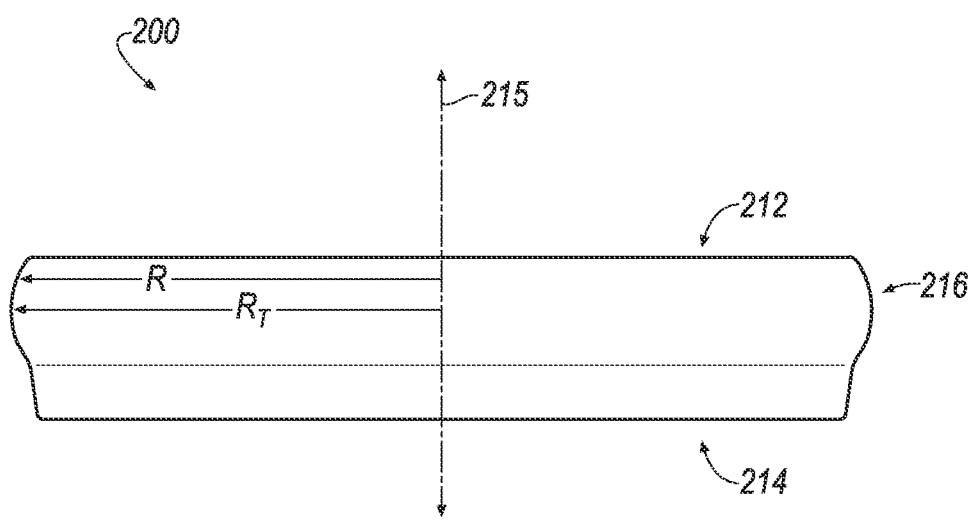

In some implementations, as in the example shown in FIG. 9, a radius R of the outer annular surface 216 about the center axis 215 increases along the center axis 215 from a plane of the first axial surface 212 to a threshold radius $R_T$ and then may decrease along the center axis 215 after reaching the threshold radius $R_T$. By altering the radius R of the outer annular surface 216 (i.e., the distance from the center axis 215 to the annular surface 216 at any given point on the annular surface 216), a side profile or surface geometry of the annular surface 216 changes along a direction of the center axis 215, so as to achieve different surface profiles and shapes. This may provide an arcuate or chamfered outer annular surface 216, for example.

The seal 200 may be molded, machined, or otherwise formed of a compliant material, such as rubber, cork, foam, or some other material capable of providing a liquid-tight interface.

The first axial surface 212 and the outer annular surface 216 provide at least two sealing surfaces engaged with a received filter head 300. This double seal arrangement provides relatively greater sealing and leak prevention over a single seal. Moreover, in examples using an arcuate or chamfered outer annular surface 216, the outer annular surface 216 may self-locate the seal 200 in the filter head 300 and elastically deform to accommodate various tolerance interferences between the filter assembly 100 and the filter head 300, and/or to provide sealing engagement therebetween. The double seal arrangement may also provide vibration dampening from the filter head 300 to the filter assembly 100.

A number of implementations have been described. Nevertheless, it will be understood that various modifications may be made without departing from the spirit and scope of the disclosure. Accordingly, other implementations are within the scope of the following claims.

What is claimed is:

1. A filter assembly comprising:
a filter body defining a mouth;
a filter element disposed in the filter body; and
a seal disposed on the mouth, the seal having a seal body defining a center axis;
wherein the seal body has an axial surface perpendicular to the center axis and an outer annular surface revolved about the center axis, a first portion of the outer annular surface defining an arcuate shape and a second portion of the outer annular surface defining a substantially frustoconical shape.

2. The filter assembly of claim 1, wherein a radius of the outer annular surface about the center axis increases from a plane of the axial surface along the center axis to a threshold radius.

3. The filter assembly of claim 2, wherein the radius of the outer annular surface about the center axis decreases along the center axis after reaching the threshold radius.

4. The filter assembly of claim 1, wherein the filter body defines a substantially cylindrical shape and has first and second opposite end portions, the first end portion defining the mouth.

5. The filter assembly of claim 1, further comprising a cover disposed over the mouth, the seal body defining a groove received by at least one of a mouth rim of the filter body and the cover.

6. The filter assembly of claim 5, further comprising a biasing element disposed in the filter body and biasing the filter element toward the mouth.

7. The filter assembly of claim 6, further comprising a filter support disposed in the filter body and arranged to support at least a portion of the filter element on a side opposite of the biasing element, the biasing element biasing the filter element against the filter support.

8. A filter assembly comprising:
a filter body defining a mouth;
a filter element disposed in the filter body; and
a seal disposed on the mouth, the seal having a seal body defining a center axis;
wherein the seal body has an axial surface perpendicular to the center axis and an outer annular surface forming a shoulder with the axial surface, a portion of the outer annular surface extending away from the axial surface at an angle greater than 90 degrees.

9. The filter assembly of claim 8, wherein a portion of the outer annular surface defining at least one of an arcuate and a substantially frustoconical shape.

10. The filter assembly of claim 8, wherein the filter body defines a substantially cylindrical shape and has first and second opposite end portions, the first end portion defining the mouth.

11. The filter assembly of claim 8, further comprising a cover disposed over the mouth, the seal body defining a groove received by at least one of a mouth rim of the filter body and the cover.

12. The filter assembly of claim 11, further comprising a biasing element disposed in the filter body and biasing the filter element toward the mouth.

13. The filter assembly of claim 12, further comprising a filter support disposed in the filter body and arranged to support at least a portion of the filter element on a side opposite of the biasing element, the biasing element biasing the filter element against the filter support.

14. A filter assembly comprising:
a filter body defining a mouth;
a filter element disposed in the filter body; and
a seal disposed on the mouth, the seal having a seal body defining a center axis;
wherein the seal body has first and second axial surfaces disposed opposite of each other and perpendicular to the center axis, the seal body having an outer annular surface concentric with the center axis and defining a substantially frustoconical shape, the second axial surface attached to the mouth.

15. The filter assembly of claim 14, wherein a radius of the outer annular surface about the center axis increases from a plane of the first axial surface along the center axis to a threshold radius.

16. The filter assembly of claim 15, wherein the radius of the outer annular surface about the center axis decreases along the center axis after reaching the threshold radius.

17. The filter assembly of claim 14, wherein the filter body defines a substantially cylindrical shape and has first and second opposite end portions, the first end portion defining the mouth.

18. The filter assembly of claim 14, further comprising a cover disposed over the mouth, the seal body defining a groove received by at least one of a mouth rim of the filter body and the cover.

19. The filter assembly of claim 18, further comprising a biasing element disposed in the filter body and biasing the filter element toward the mouth.

20. The filter assembly of claim 19, further comprising a filter support disposed in the filter body and arranged to support at least a portion of the filter element on a side opposite of the biasing element, the biasing element biasing the filter element against the filter support.

* * * * *